(12) United States Patent
Arnal et al.

(10) Patent No.: US 6,273,070 B1
(45) Date of Patent: Aug. 14, 2001

(54) FUEL TANK CANISTER AND FUEL TANK EQUIPPED WITH SAME

(75) Inventors: André Arnal, Frontonas; Philippe Decobert, Paillart; Alexis Rosseel, Compiegne, all of (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/403,485

(22) PCT Filed: Feb. 19, 1999

(86) PCT No.: PCT/FR99/00377
 § 371 Date: May 4, 2000
 § 102(e) Date: May 4, 2000

(87) PCT Pub. No.: WO99/42316
 PCT Pub. Date: Aug. 26, 1999

(30) Foreign Application Priority Data

Feb. 19, 1998 (FR) .................................................. 98 02019

(51) Int. Cl.[7] .................................................. F02M 33/04
(52) U.S. Cl. .............................................................. 123/519
(58) Field of Search ..................... 137/43, 202; 123/518, 123/519, 520

(56) References Cited

U.S. PATENT DOCUMENTS

| 4,173,207 | 11/1979 | Hiramatsu . | |
| 4,507,132 | * 3/1985 | Yoshida | 123/519 |
| 4,701,198 | 10/1987 | Uranishi et al. . | |
| 4,852,761 | * 8/1989 | Turner et al. | 123/519 |
| 4,894,072 | * 1/1990 | Turner et al. | 123/519 |
| 4,919,103 | 4/1990 | Ishiguro et al. . | |
| 5,170,765 | * 12/1992 | Hoshino et al. | 123/519 |
| 5,355,861 | * 10/1994 | Arai | 123/519 |

FOREIGN PATENT DOCUMENTS

| 43 04 180 A1 | 8/1993 | (DE) . |
| 44 29 875 A1 | 3/1995 | (DE) . |
| 195 24 254 C1 | 1/1997 | (DE) . |
| 0 775 606 A2 | 5/1997 | (EP) . |

* cited by examiner

*Primary Examiner*—Thomas N. Moulis
(74) *Attorney, Agent, or Firm*—Schweitzer Cornman Gross & Bondell LLP

(57) ABSTRACT

The invention relates to a fuel tank canister for placing in a vent circuit and containing a filter substance suitable for fixing gaseous fuel molecules. At least one compartment communicating with its filter substance and suitable for receiving a device selected from the following devices: a device for closing the vent circuit in the event of the tank being turned upsidedown; a device for preventing the tank being overfilled; and a device for separating liquid fuel from the gas to be vented.

24 Claims, 1 Drawing Sheet

U.S. Patent    Aug. 14, 2001    US 6,273,070 B1
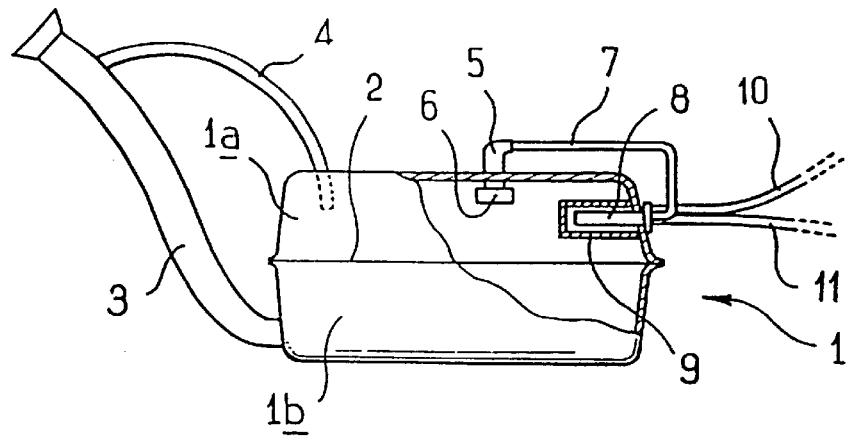
FIG_1
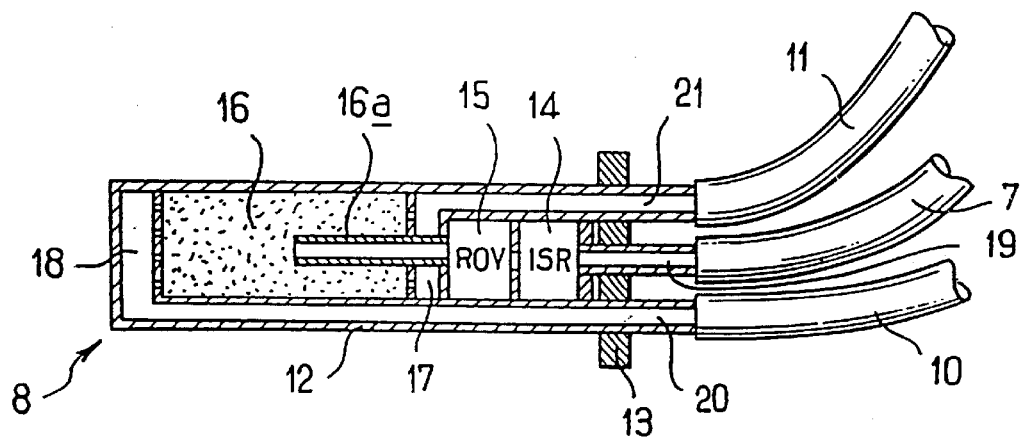
FIG_2
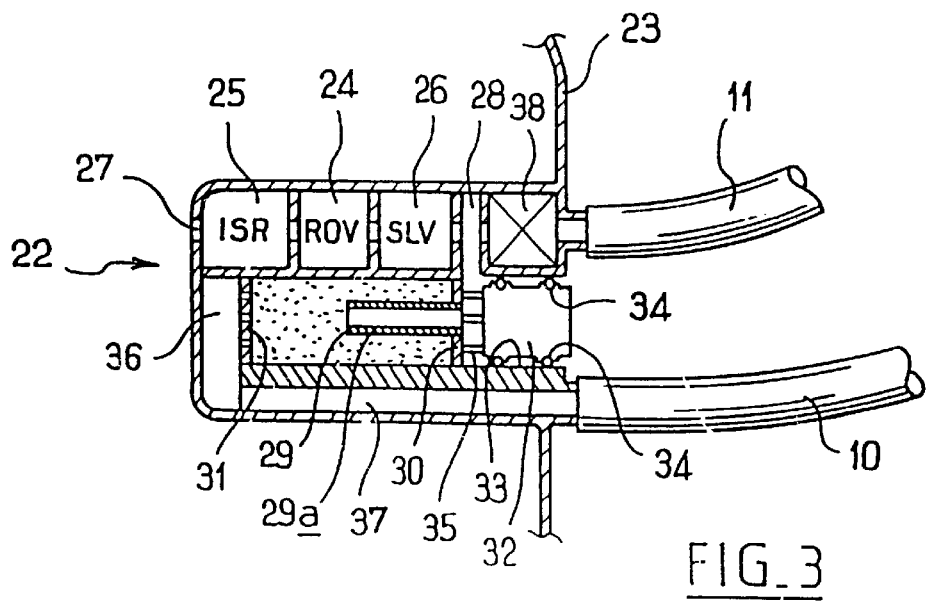
FIG_3

FUEL TANK CANISTER AND FUEL TANK EQUIPPED WITH SAME

The present invention relates to a fuel tank canister and to a fuel tank fitted with such a canister.

BACKGROUND OF THE INVENTION

It is known that a fuel tank includes firstly a degassing circuit which enables the gas contained in the tank to escape during filling, and secondly a vent circuit to vent the major portion of the gases generated inside the tank because of the shaking caused by the vehicle while it is in motion.

In conventional manner, such a vent circuit comprises: a device for closing the circuit in the event of the tank being turned upsidedown, this device generally being constituted by a so-called "rollover valve" (ROV) whose function is to prevent liquid fuel from escaping from the tank via the gas vent circuit in the event of the vehicle rolling over; a device for preventing the tank being overfilled, also referred to by the [French] initials "ISR", and whose function is to close the vent circuit during filling to have the effect of maintaining a volume of gas inside the tank suitable for absorbing any excess pressure that might result from the liquid fuel heating or from the tank being deformed; a device for separating the liquid fuel from the gas for venting, also known by the initials "SLV" (for separate liquid/vapor) to prevent droplets of fuel from penetrating into the vent circuit; and a canister for fixing molecules of gaseous fuel present in the vented gas and for allowing only air cleared of fuel vapor to escape into the atmosphere.

The canister is a portion of the vent circuit that makes it necessary to have the "SLV" since it contains active carbon as the material for absorbing molecules of gaseous fuel, and active carbon degrades in contact with liquids.

To interconnect all those devices, it is necessary to prepare and assemble a certain number of ducts, and that implies cost which is not negligible either in terms of raw materials, since the ducts must be of sufficient strength and must be proof against hydrocarbons, so they need to be made out of materials that are expensive such as multilayer materials based on high density polyethylene or polyamide associated with a barrier-forming resin such as polyvinylidene fluoride or polyvinyl alcohol, or in terms of labor since it is difficult to automate interconnection of the devices, particularly if some of them are fixed on the vehicle and not on the tank, as is generally the case at least for the canister, which means that the interconnection ducts cannot be put into place remote from the vehicle assembly line.

In addition, in the vent circuit constituted by a series connection of the ducts and the various devices listed above, the ducts give rise to significant head losses, and that degrades venting efficiency.

Furthermore, the presence of ducts outside the tank increases the size of the tank, makes it difficult to handle while it is being installed on the vehicle, and makes it necessary to take account of constraints imposed by the immediate surroundings of the tank when in position on the vehicle, often constraining the ducts to follow paths over the tank that are lengthy and contorted.

OBJECTS AND SUMMARY OF THE INVENTION

The present invention seeks to resolve those drawbacks by proposing a canister and a fuel tank of novel design.

In a first aspect, the present invention provides a canister for placing in a vent circuit and containing a filter substance suitable for fixing gaseous fuel molecules, the canister comprising at least one compartment communicating with its filter substance and suitable for receiving a device selected from the following devices: a device for closing the vent circuit in the event of the tank being turned upsidedown; a device for preventing the tank being overfilled; and a device for separating liquid fuel from the gas to be vented.

It will be understood that by means of the invention, the problems associated with the presence of ducts outside the tank can be eliminated by integrating all or some of the devices present in the vent circuit within the canister.

This gives rise to a significant reduction in manufacturing and assembly costs associated with the vent circuit, and also to venting that is more effective.

In another aspect, the invention provides a tank fitted with a canister as described above.

In a preferred embodiment of the invention, the fuel tank includes a housing open to the outside of the tank for receiving the canister.

In which case, only one gas duct leaves the tank to go to the canister, with the canister also being connected to a duct for exhausting air that has been cleared of fuel vapor.

In a variant, the end wall of the housing includes an orifice to enable the canister to communicate directly with the inside of the tank. The duct for gas leaving the tank can thus be eliminated and the vent circuit is limited to the canister box connected to the duct for exhausting air that has been cleared of fuel vapor.

In a particular version, the canister has a box which is constituted at least in part by the wall of the housing, the filter substance of the canister being contained in a preferably-removable filter cartridge engaged in the housing from the outside of the tank.

This variant is particularly advantageous since it eliminates any problem of sealing concerning the coupling connecting the gas duct to the canister.

In a preferred embodiment, and in particular for implementing this version of the tank, the tank is made by using adhesive or heat-sealing to unite two portions obtained by injection molding a plastics material.

BRIEF DESCRIPTION OF THE DRAWING

In order to improve understanding of the invention, there follows a description of embodiments given as non-limiting examples, with reference to the accompanying drawing, in which:

FIG. 1 is a partially cutaway view of a fuel tank constituting a first embodiment of the invention;

FIG. 2 is a section view of the canister shown in FIG. 1; and

FIG. 3 is a close-up view of a canister integrated in a tank and constituting another embodiment of the invention.

MORE DETAILED DESCRIPTION

The fuel tank 1 of FIG. 1 is constituted by a top portion 1a and a bottom portion 1b that are obtained separately by injection molding a plastics material and that are united in a midplane 2 by means of adhesive or heat-sealing.

A filler tube 3 and a degassing duct 4 are provided in a conventional configuration to enable gas to escape while the tank is being filled.

A tube 5 passes through the top wall of the tank and enables the gas contained in the tank to escape while the vehicle is in motion, in the event of the gas pressure increasing.

This applies in particular when the tank is subjected to vibration that can cause the liquid fuel to degas, or when heating of the tank causes the liquid fuel and the gas to expand.

An "SLV" device 6 for separating the liquid fuel from substances in the vapor phase is shown at the end of the tube 5 that is situated inside the tank.

In conventional manner it can be constituted by a check valve.

A gas duct 7 is connected to the end of the tube situated outside the tank leading to a canister 8 which is shown in greater detail in FIG. 2.

The tank has a housing 9 for receiving the canister, said housing being open to the outside so as to enable the canister to be installed therein.

The location of the housing 9 in the tank is determined as a function of the shape of the vehicle around the tank, so as to make it easy for the canister to be removed after the tank has been installed on the vehicle.

Two other ducts lead to the canister, a duct 10 for evacuating air that has been cleared of fuel vapor and that comes from the canister, and another duct 11 for sucking air from the canister when it is being purged.

The canister is described in detail below with reference to FIG. 2.

The canister comprises a box 12 whose external shape is cylindrical, the box being provided with a flange 13 at one of its end to enable it to be positioned in the housing 9 of the tank.

Retention means (not shown), e.g. operating by snap-fastening, prevent the canister from leaving its housing 9 once it has been put into place.

Inside the canister, there can be seen two small compartments 14 and 15 that are in communication with each other and that are designed respectively to receive an "ISR", i.e. a device for preventing the tank being overfilled, and an "ROV", i.e. a device for preventing the liquid fuel contained in the tank from escaping via the canister in the event of the vehicle rolling over.

A third compartment 16 extends over about half the length of the canister and contains active carbon for absorbing fuel molecules contained in the gases reaching the canister.

This third compartment 16 communicates with the "ROV" compartment 15 via a tube 16a that terminates in the core of the active carbon after passing through a first communication chamber 17.

At the end opposite to the chamber 17, there is a second communication chamber 18 in communication with the compartment 16.

The canister also has three channels leading to the outside of the canister, namely a first channel 19 connected to the "ISR", a second channel 20 connected to the communication chamber 18, and a third channel 21 connected to the communication chamber 17.

The gas duct 7, the air vent duct 10, and the suction duct 11 are connected respectively to the outer ends of the channels 19, 20, and 21.

Depending on the configuration adopted by the vehicle manufacturer, it is possible to provide electrically controlled valves (not shown) serving, for example, during normal operation to keep the duct 11 closed and the duct 7 open, and, while the canister is being purged, to maintain the opposite configuration.

In normal operation, the canister receives gas coming from the tank via the gas duct 7. The gas passes through the "ISR", and then the "ROV", and passes into the core of the active carbon via the tube 16a, after which it passes through the carbon.

Fuel molecules are fixed in the active carbon by adsorption and only air can reach the communication chamber 18 so as to leave the canister via the channel 20, and thus reach the air vent duct 10.

During purging, air sucked in via the duct 11 gives rise to a flow of air coming from the air duct 10 that passes through the active carbon in the opposite direction to the filtering direction.

The active carbon molecules are thus released by desorption and the gases collected in this way are sent to a reprocessing system or, more conventionally, to the circuit for feeding fuel to the engine which serves simultaneously to generate the suction and to recycle the gaseous fuel.

In the embodiment of FIG. 3, the canister 22 comprises a box which is formed directly in the wall 23 of the tank.

The tank is made by injection molding a plastics material in a mold cavity which defines the shape of the tank and the shape of the housing constituting the box of the canister.

As in the preceding embodiment, this canister has compartments 24 and 25 for the "ROV" and for the "ISR", which compartments are in communication with each other.

A third small compartment 26 communicating in series with the compartment 24 contains the "SLV".

The compartment 25 communicates with the inside of the tank via an orifice 27 formed through the end wall of the housing.

The gas leaving the tank through said orifice 27, which is preferably situated at a high point of the tank, and passing successively through the compartments 25, 24, and 26 reaches a communication chamber 28. Naturally, the order of the three devices "ISR", "ROV", and "SLV" could be different from that described herein.

Beside the three small compartments, the canister box has a large compartment 29 containing a removable filter cartridge filled with active carbon between two grids 30 and 31. The grid 31 closer to the tank is fixed while the opposite grid 30 is secured to a plug 32 engaged in a chimney 33 which it closes in sealed manner by means of O-rings 34.

Spacers 35 hold the grid 30 at a distance from the plug 32 so as to leave a gap between them enabling the compartment 29 to communicate with the communication chamber 28.

A tube 29a puts said space into communication with the core of the active carbon.

Thus, the gas that has passed successively through the "ISR", the "ROV", and the "SLV" penetrates into the core of the large compartment 29 where it is filtered.

Fuel molecules are fixed by the active carbon and only air leaves the compartment 29 via the grid 31 leading to a communication chamber 36.

A channel 37 opens out into the chamber 36 and crosses the entire length of the box for connection to the air vent duct 10.

The suction duct 11 terminates at another small compartment 38 in alignment with the other three small compartments, but separated from them by the communication chamber 28. The compartment 38 contains an electrically controlled valve which closes the suction passage while the canister is in operation.

To purge the canister, the valve opens the passage and air is sucked by the air duct 10 through the active carbon contained in the large compartment 29 where it picks up desorbed fuel molecules.

In this embodiment, tank gas venting is never interrupted, even while the canister is being purged, given that the orifice 27 remains open continuously.

Naturally, the embodiment described above is not limiting in any way and can receive any desirable modification without thereby going beyond the ambit of the invention.

What is claimed is:

1. A fuel tank comprising a canister for placing in a vent circuit and containing a filter substance suitable for fixing gaseous fuel molecules, said fuel tank comprising a lateral wall, wherein said canister is mounted on said lateral wall.

2. The fuel tank according to claim 1, wherein said canister has a longitudinal axis which extends horizontally.

3. The fuel tank according to claim 1, wherein said lateral wall has an orifice for receiving said canister.

4. The fuel tank according to claim 1, wherein said fuel tank has a housing made integrally with said lateral wall for receiving said canister.

5. The fuel tank according to claim 4, wherein said housing has an opening which communicates with the outside of the fuel tank in the absence of said canister.

6. The fuel tank according to claim 4, wherein said housing has an end wall including an orifice to enable the canister to communicate directly with the inside of the tank.

7. The fuel tank according to claim 4, wherein said housing has a wall in contact with the filter substance of the canister.

8. The fuel tank according to claim 4, wherein said filter substance is contained in a filter cartridge.

9. The fuel tank according to claim 8, wherein said filter cartridge is removable.

10. The fuel tank according to claim 1, wherein said canister has a nozzle for connecting a duct, said nozzle extending along a horizontal axis.

11. The fuel tank according to claim 1, wherein it is made by injection molding of a plastics material.

12. The fuel tank according to claim 11, wherein it is made by the assembly of two parts made by injection molding.

13. The fuel tank according to claim 1, wherein said canister has at least one compartment communicating with said filter substance and suitable for receiving a device selected from the following devices: a device for closing the vent circuit in the event of the tank being turned upside down; a device for preventing the tank from being overfilled; and a device for separating liquid fuel from the gas to be vented.

14. A fuel tank comprising a canister for placing in a vent circuit and containing a filter substance suitable for fixing gaseous fuel molecules and a housing for receiving said canister, wherein said housing is made integrally with a wall of said fuel tank.

15. The fuel tank according to claim 14, made by injection molding of a plastics material.

16. The fuel tank according to claim 14, wherein said housing has an opening for receiving said canister.

17. The fuel tank according to claim 14, wherein said housing has a longitudinal axis that extends horizontally.

18. The fuel tank according to claim 14, wherein said housing has an end wall including an orifice to enable the canister to communicate directly with the inside of the tank.

19. The fuel tank according to claim 14, wherein said housing has a wall in contact with the filter substance of the canister.

20. The fuel tank according to claim 14, wherein said filter substance is contained in a filter cartridge.

21. The fuel tank according to claim 20, wherein said filter cartridge is removable.

22. The fuel tank according to claim 14, wherein said canister has a nozzle for connecting a duct, said nozzle extending along a horizontal axis.

23. The fuel tank according to claim 14, wherein it is made by the assembly of two parts made by injection molding.

24. The fuel tank according to claim 14, wherein said canister has at least one compartment communicating with said filter substance and suitable for receiving a device selected from the following devices: a device for closing the vent circuit in the event of the tank being turned upside down; a device for preventing the tank from being overfilled; and a device for separating liquid fuel from the gas to be vented.

* * * * *